US005244650A

United States Patent [19]

Kuznicki et al.

[11] Patent Number: 5,244,650

[45] Date of Patent: Sep. 14, 1993

[54] LARGE-PORED MOLECULAR SIEVES WITH CHARGED OCTAHEDRAL TITANIUM AND CHARGED TETRAHEDRAL ALUMINUM SITES

[75] Inventors: Steven M. Kuznicki; Kathleen A. Thrush, both of Easton, Pa.

[73] Assignee: Engelhard Corporation, Iselin, N.J.

[21] Appl. No.: 529,021

[22] Filed: May 25, 1990

Related U.S. Application Data

[63] Continuation-in-part of Ser. No. 373,855, Jun. 29, 1989, abandoned.

[51] Int. Cl.$^5$ .............................................. C01B 33/34
[52] U.S. Cl. ..................................... 423/718; 502/60; 502/65

[58] Field of Search .................. 423/328, 263, 718; 502/65, 60

[56] References Cited

U.S. PATENT DOCUMENTS

| 4,137,152 | 1/1979 | Chester et al. | 423/328 C |
| 4,707,345 | 11/1987 | Lok et al. | 423/328 |
| 4,853,202 | 8/1989 | Kuznicki | 423/326 |

Primary Examiner—Michael Lewis
Assistant Examiner—Stuart L. Hendrickson
Attorney, Agent, or Firm—Inez L. Moselle

[57] ABSTRACT

A crystalline-titanium-aluminum-silicate molecular sieve is disclosed having both di-charged octahedrally coordinated titanium and mono-charged tetrahedrally coordinated aluminum in its framework.

4 Claims, No Drawings

LARGE-PORED MOLECULAR SIEVES WITH CHARGED OCTAHEDRAL TITANIUM AND CHARGED TETRAHEDRAL ALUMINUM SITES

CROSS-REFERENCE TO RELATED CASES

This is a continuation-in-part of Ser. No. 07/373,855, filed Jun. 29, 1989, now abandoned.

BACKGROUND OF THE INVENTION

1. Field of the Invention

This invention relates to new crystalline titanium molecular sieve zeolite compositions, having both aluminum and titanium in the framework structure, methods for preparing the same; uses thereof such as organic compound conversions therewith, especially hydrocarbon conversions and in ion exchange applications. The novel materials of this invention owe their uniqueness to the fact that the framework titanium is octahedrally coordinated whereas the framework aluminum is tetrahedrally coordinated.

2. Background of the Invention and Prior Art

Since the discovery by Milton and coworkers (U.S. Pat. No. 2,882,243 and U.S. Pat. No. 2,882,244) in the late 1950's that aluminosilicate systems could be induced to form uniformly porous, internally charged crystals, analogous to molecular sieve zeolites found in nature, the properties of synthetic aluminosilicate zeolite molecular sieves have formed the basis of numerous commercially important catalytic, adsorptive and ion-exchange applications. This high degree of utility is the result of a unique combination of high surface area and uniform porosity dictated by the "framework" structure of the zeolite crystals coupled with the electrostatically charged sites induced by tetrahedrally coordinated $Al^{+3}$. Thus, a large number of "active" charged sites are readily accessible to molecules of the proper size and geometry for adsorptive or catalytic interactions. Further, since charge compensating cations are electrostatically and not covalently bound to the aluminosilicate framework, they are generally exchangeable for other cations with different inherent properties. This offers wide latitude for modification of active sites whereby specific adsorbents and catalysts can be tailor-made for a given utility.

In the publication "Zeolite Molecular Sieves", Chapter 2, 1974, D. W. Breck hypothesized that perhaps 1,000 aluminosilicate zeolite framework structures are theoretically possible, but to date only approximately 150 have been identified. While compositional nuances have been described in publications such as U.S. Pat. No. 4,524,055, U.S. Pat. No. 4,603,040 and U.S. Pat. No. 4,606,899, totally new aluminosilicate framework structures are being discovered at a negligible rate. Of particular importance to fundamental progress in the catalysis of relatively large hydrocarbon molecules, especially fluid cracking operations, is the fact that it has been a generation since the discovery of any new large pored aluminosilicate zeolite.

With slow progress in the discovery of new wide pored aluminosilicate based molecular sieves, researchers have taken various approaches to replace aluminum or silicon in zeolite synthesis in the hope of generating either new zeolite-like framework structures or inducing the formation of qualitatively different active sites than are available in analogous aluminosilicate based materials. While progress of academic interest has been made from different approaches, little success has been achieved in discovering new wide pore molecular sieve zeolites.

It has been believed for a generation that phosphorus could be incorporated, to varying degrees, in zeolite type aluminosilicate frameworks. In the more recent past (JACS 104 pp. 1146 (1982); Proceedings of the 7th International Zeolite Conference, pp. 103-112, 1986) E. M. Flanigan and coworkers have demonstrated the preparation of pure aluminophosphate based molecular sieves of a wide variety of structures. However, the site inducing $Al^{+3}$ is essentially neutralized by the $P^{+5}$, imparting a +1 charge to the framework. Thus, while a new class of "molecular sieves" was created, they are not zeolites in the fundamental sense since they lack "active" charged sites.

Realizing this inherent utility limiting deficiency, for the past few years the molecular sieve research community has emphasized the synthesis of mixed aluminosilicate-metal oxide and mixed aluminophosphate-metal oxide framework systems. While this approach to overcoming the slow progress in aluminosilicate zeolite synthesis has generated approximately 200 new compositions, all of which suffer either from the site removing effect of incorporated $P^{+5}$ or the site diluting effect of incorporating effectively neutral tetrahedral +4 metals into an aluminosilicate type framework. As a result, extensive research by the molecular sieve research community has failed to demonstrate significant utility for any of these materials.

A series of zeolite-like "framework" silicates have been postulated, some of which have larger uniform pores than are observed for aluminosilicate zeolites. (W. M. Meier, Proceedings of the 7th International Zeolite Conference, pp. 13-22 (1986).) While this particular synthesis approach produces materials which, by definition, totally lack active, charged sites, back implementation after synthesis would not appear out of the question although little work appears in the open literature on this topic.

Another and most straightforward means of potentially generating new structures or qualitatively different sites than those induced by aluminum would be the direct substitution of some other charge inducing species for aluminum in zeolite-like structures. To date the most notably successful example of this approach appears to be boron in the case of ZSM-5 analogs, although iron has also been claimed in similar materials. (EPA 68,796 (1983), Taramasso et al; Proceedings of the 5th International Zeolite Conference; pp. 40-48 (1980)); J. W. Ball et al; Proceedings of the 7th International Zeolite Conference; pp. 137-144 (1986); U.S. Pat. No. 4,280,305 to Kouenhowen et al. Unfortunately, the low levels of incorporation of the species substituting for aluminum usually leaves doubt if the species are occluded or framework incorporated.

In 1967, Young in U.S. Pat. No. 3,329,481 reported that the synthesis of charge bearing (exchangeable) titanium silicates under conditions similar to aluminosilicate zeolite formation was possible if the titanium was present as a "critical reagent" +III peroxo species. While these materials were called "titanium zeolites" no evidence was presented beyond some questionable X-ray diffraction (XRD) patterns and his claim has generally been dismissed by the zeolite research community. (D. W. Breck, Zeolite Molecular Sieves, p. 322 (1974); R. M. Barrer, Hydrothermal Chemistry of Zeolites, p. 293 (1982); G. Perego et al, Proceedings of 7th International Zeolite Conference, p. 129 (1986).) For all but one end member of this series of materials (denoted TS materials), the presented XRD patterns indicate phases too dense to be molecular sieves. In the case of the one questionable end member (denoted TS-26), the XRD pattern might possibly be interpreted as a small pored zeolite, although without additional supporting evidence, this appears extremely questionable.

A naturally occurring alkaline titanosilicate identified as "Zorite" was discovered in trace quantities on the Kola Peninsula in 1972 (A. N. Mer'kov et al; Zapiski Vses Mineralog. Obshch., pages 54–62 (1973)). The published XRD pattern was challenged and a proposed structure reported in a later article entitled "The OD Structure of Zorite", Sandomirskii et al, Sov. Phys. Crystallogr. 24 (6), November-December 1979, pages 686–693.

No further reports on "titanium zeolites" appeared in the open literature until 1983 when trace levels of tetrahedral Ti(IV) were reported in a ZSM-5 analog. (M. Taramasso et al; U.S. Pat. No. 4,410,501 (1983); G. Perego et al; Proceedings of the 7th International Zeolite Conference; p. 129 (1986).) A similar claim appeared from researchers in mid-1985 (EPA 132,550 (1985).) More recently, the research community reported mixed aluminosilicate-titanium(IV) (EPA 179,876 (1985); EPA 181,884 (1985) structures which, along with TAPO (EPA 121,232 (1985) systems, appear to have no possibility of active titanium sites because of the titanium coordination. As such, their utility is highly questionable.

That charge bearing, exchangeable titanium silicates are possible is inferred not only from the existence of exchangeable alkali titanates and the early work disclosed in U.S. Pat. No. 3,329,481 on ill defined titanium silicates but also from the observation (S. M. Kuznicki et al; J. Phys. Chem.; 84; pp. 535-537 (1980)) of Ti-$O_4$—units in some modified zeolites.

David M. Chapman, in a speech before 11th North American Meeting of the Catalysis Society in Dearborn, Mich. (1989) gave a presentation wherein a titanium aluminosilicate gel was crystallized with Chapman claiming all the aluminum was segregated into analcime (an ultra-small pored aluminosilicate) and not incorporated into any titanium-bearing phase such as his observed analog of the mineral vinogradovite which was a pure titanium silicate. It is noted that vinogradovite, as found in nature, has been reported to contain aluminum. However, neither the synthetic analog of vinogradovite nor the mineral vinogradovite is a molecular sieve nor does it have the x-ray diffraction pattern of Table 1 of this specification.

A major breakthrough in the field of large pored titanium silicate molecular sieves is disclosed and claimed in U.S. Ser. No. 94,237, filed Sep. 8, 1987, now U.S. Pat. No. 4,853,202. The crystalline titanium silicate large pored molecular sieve of said patent, hereafter designated ETS-10, contains no deliberately added alumina but may contain very minor amounts of alumina due to the presence of impurities. Thus, ETS-10 typically has a molar ratio of $SiO_2/Al_2O_3$ greater than 100 or more.

SUMMARY OF THE INVENTION

The present invention relates to a new family of stable, large pore crystalline titanium-aluminum-silicate molecular sieves, hereinafter designated ETAS-10, their method of preparation and the use of such compositions as adsorbents, catalysts for the conversion of a wide variety of organic compounds, e.g., hydrocarbon compounds and oxygenates such as methanol as well as ion-exchangers for the removal of undesirable metal cations from solutions containing the same.

DETAILED DESCRIPTION OF THE INVENTION

The present invention relates to a new family of stable crystalline titanium-aluminum-silicate molecular sieve which have a pore size of approximately 9 Angstrom units. These titanium-aluminum-silicates have a definite X-ray diffraction pattern and can be identified in terms of mole ratios of oxides as follows:

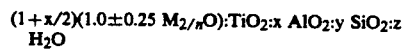

wherein M is at least one cation having a valence of n, y is from 2.0 to 100, x is from 0.05 to 5.0 and z is from 0 to 100. In a preferred embodiment, M is a mixture of alkali metal cations, particularly sodium and potassium, and y is at least 2.0 and ranges up to about 10.

The original cations M can be replaced at least in part with other cations by well known exchange techniques. Preferred replacing cations include hydrogen, ammonium, rare earth, transition metals and mixtures thereof. Members of the family of molecular sieve zeolites designated ETAS-10 have a high degree of thermal stability of at least 350° C. or higher, thus rendering them effective for use in high temperature catalytic processes. ETAS-10 zeolites are highly adsorptive toward molecules up to approximately 9 Angstroms in critical diameter such as 1,3,5-trimethylbenzene. In the sodium form, ETAS-10 is completely reversibly dehydratable with a water capacity of approximately 20 weight percent.

Members of the ETAS-10 family of molecular sieve zeolites have a crystalline structure and an X-ray powder diffraction pattern having the following significant lines:

TABLE 1

| XRD POWDER PATTERN OF ETAS-10 (0–40° 2 theta) | |
|---|---|
| SIGNIFICANT d-SPACING (ANGS.) | $I/I_o$ |
| 14.7 − .50 + 1.0 | W-M |
| 7.20 ± .15 (optional) | W-M |
| 4.41 − .05 + 0.25 | W-M |
| 3.60 − .05 + 0.25 | VS |
| 3.28 − .05 + .2 | M-S |

In the above table,
VS = 60–100
S = 40–60
M = 20–40
W = 5–20

In the above table,
VS=60–100
S=40–60
M=20–40
W=5–20

The above values were determined by standard x-ray diffraction techniques. The radiation was the K-alpha doublet of copper, and a scintillation counter spectrometer was used. The peak heights, I, and the positions as a function of 2 times theta, where theta is the Bragg angle, were read from the spectrometer chart. From these, the relative intensities, 100 $I/I_0$, where $I_0$ is the intensity of the strongest line or peak, and d (obs.), the interplanar spacing in angstroms, corresponding to the recorded lines, were calculated. These interplanar d- spacings define the crystalline structure of the particular composition. It has been determined that the X-ray powder diffraction peaks characteristics of ETS-10 are systematically altered by the inclusion of increasing amounts of aluminum addition in ETAS-10. Such systematic alterations are taken as prima facie evidence of framework incorporation of some newly introduced species much akin to classical zeolite synthesis. As pointed out in U.S. Pat. No. 4,853,202, ETS-10 contains the most significant lines which are set forth as follows:

TABLE 2

ETS-10 CHARACTERISTIC d-SPACINGS

| d-SPACING (ANGS.) | I/I$_o$ |
|---|---|
| 14.7 ± 0.35 | W-M |
| 7.20 ± 0.15 | W-M |
| 4.41 ± 0.10 | W-M |
| 3.60 ± 0.05 | VS |
| 3.28 ± 0.05 | W-M |

It has been found that as the degree of aluminum incorporation increases in ETAS-10, the largest d-spacing analogous to 14.7 Å in ETS-10 and the strongest characteristic d-spacing analogous to 3.60 Å in ETS-10 markedly increase. In fact, as higher levels of aluminum incorporation are attained, the increase of these lines falls outside the claim limits for ETS-10. Additionally, one of the characteristic d-spacings 7.20 Å disappears. However, it is not known at this time if the disappearance represents a structural change or if it is morphologically induced.

Although ETAS-10 is structurally related to ETS-10, introduction of substantial quantities of highly polar mono-charged tetrahedral aluminum sites into the zeolitic framework profoundly alters the character of the sieve, impacting adsorptive, ion-exchange and catalytic properties. ETAS-10 can be clearly and easily differentiated from ETS-10 by standard analytical techniques such as NMR and in some cases by X-ray diffraction.

While structurally related to ETS-10, incorporation of aluminum into the framework structure of ETAS-10 systematically expands the lattice planes and pore openings. This in turn allows ETAS-10 to sorb molecules somewhat larger than those sorbed by ETS-10. Additionally, the sorbtive properties are transformed from a relatively weak to a stronger sorbant and much more powerful ion-exchanger. The ion exchange properties are altered in such a manner that certain heavy metals, especially lead, are evacuated from aqueous solutions essentially on contact. The incorporation of aluminum into the framework also makes the catalytic acidity of ETAS-10 substantially different than that of ETS-10 in that it is very strong, capable of cracking alkanes as would be expected from zeolitic aluminum sites but the high alkene yield characteristic of relatively weak octahedral sites is retained.

It is to be immediately understood that applicants are not maintaining to be the first to have prepared a molecular sieve containing titanium, aluminum and silicon in significant amounts. Materials of this type have previously been reported in the TASO work of Lok, EPO 181,884 and EPO 179,876 previously referred to. However, in both the specifications and claims of these patents, it is clearly stated that the silicon, titanium and aluminum are tetrahedral with the titanium being therefore uncharged. The crystal structures of the instant invention on the other hand, have di-charged octahedrally coordinated titanium in combination with mono-charged tetrahedrally coordinated aluminum sites.

ETAS-10 molecular sieves can be prepared from a reaction mixture containing a titanium source such as titanium trichloride with an aluminum source such as aluminum chloride, a source of silica, a source of alkalinity such as an alkali metal hydroxide, water and, optionally, an alkali metal fluoride mineralizer having a composition in terms of mole ratios falling within the following ranges.

TABLE 3

|  | Broad | Preferred | Most Preferred |
|---|---|---|---|
| SiO$_2$/Al | 1–200 | 2–100 | 2–20 |
| SiO$_2$/Ti | 2–20 | 2–10 | 2–7 |
| H$_2$O/SiO$_2$ | 2–100 | 5–50 | 10–25 |
| M$_n$/SiO$_2$ | 0.1–20 | 0.5–5 | 1–3 | wherein M indicates the cations of valence n derived from the alkali metal hydroxide and fluoride and/or alkali metal salts used for preparing the titanium silicate according to the invention. The reaction mixture is heated to a temperature of from about 100° C. to 250° C. for a period of time ranging from about 2 hours to 40 days, or more. The hydrothermal reaction is carried out until crystals are formed and the resulting crystalline product is thereafter separated from the reaction mixture, cooled to room temperature, filtered and water washed. The reaction mixture can be stirred although it is not necessary. It has been found that when using gels, stirring is unnecessary but can be employed. When using sources of titanium which are solids, stirring is beneficial. The preferred temperature range is 150° C. to 225° C. for a period of time ranging from 4 hours to 7 days. Crystallization is performed in a continuous or batchwise manner under autogenous pressure in an autoclave or static bomb reactor. Following the water washing step, the crystalline ETAS-10 is dried at temperatures of 100° to 600° F. for periods up to 30 hours.

The method for preparing ETAS-10 compositions comprises the preparation of a reaction mixture constituted by sources of silica, sources of alumina, sources of titanium, sources of alkalinity such as sodium and/or potassium oxide and water having a reagent molar ratio composition as set forth in Table 3. Optionally, sources of fluoride such as potassium fluoride can be used, particularly to assist in solubilizing a solid titanium source such as Ti$_2$O$_3$. However, when titanium aluminum silicates are prepared from gels, its value is diminished.

It is to be understood that prior to crystallization, the gel resulting from the reaction mixture can be subjected to one or more thermal treatments at temperatures of from about 150° C. to 800° C. for 1–48 hours. The thermally treated gel is mixed with water and crystallized into ETAS-10.

Quite obviously, it is possible to use less caustic or other reactants in the gel than set forth in Table 3 and supply these during the crystallization step after the gel has been thermally treated.

The silica source includes most any reactive source of silicon such as silica, silica hydrosol, silica gel, silicic acid, alkoxides of silicon, alkali metal silicates, preferably sodium or potassium, or mixtures of the foregoing.

The titanium oxide source is trivalent or tetravalent and compounds such as titanium trichloride, TiCl$_3$, titanium tetrachloride, TiCl$_4$, or titanium oxychloride, TiOCl$_2$ can be used.

The aluminum source can include sodium aluminate, aluminum salts such as aluminum chloride, as well as solid sources of soluble alumina, such as alumina, metakaolin, etc.

The source of alkalinity is preferably an aqueous solution of an alkali metal hydroxide, such as sodium hydroxide, which provides a source of alkali metal ions for maintaining electrovalent neutrality and controlling the pH of the reaction mixture within the range of ~10.0 to 12.0 using the technique elaborated upon in U.S. Pat. No. 4,853,202. As shown in the examples hereinafter, pH is critical for the production of ETAS-10. The alkali metal hydroxide serves as a source of sodium oxide which can also be supplied by an aqueous solution of sodium silicate.

The crystalline titanium-aluminum-silicates as synthesized can have the original components thereof replaced by a wide variety of others according to techniques well known in the art. Typical replacing components would include hydrogen, ammonium, alkyl ammonium and aryl ammonium and metals, including mixtures of the same. The hydrogen form may be prepared, for example, by substitution of original sodium with ammonium or by the use of a weak acid. The composition is then calcined at a temperature of, say, 1000° F. causing evolution of ammonia and retention of hydrogen in the composition, i.e., hydrogen and/or decationized form. Of the replacing metals, preference is accorded to metals of Groups II, IV and VIII of the Periodic Table, preferably the rare earth metals.

The crystalline titanium-aluminum-silicates are then preferably washed with water and dried at a temperature ranging from about 100° F. to about 600° F. and thereafter calcined in air or other inert gas at temperatures ranging from 500° F. to 1500° F. for periods of time ranging from ½ to 48 hours or more.

Regardless of the synthesized form of the titanium silicate the spatial arrangement of atoms which form the basic crystal lattices remain essentially unchanged by the replacement of sodium or other alkali metal or by the presence in the initial reaction mixture of metals in addition to sodium, as determined by an X-ray powder diffraction pattern of the resulting titanium silicate. The X-ray diffraction patterns of such products are essentially the same as those set forth in Table I above (with the exception that the 7.20±0.15 Å line is sometimes not observed).

The crystalline titanium-aluminum-silicates prepared in accordance with the invention are formed in a wide variety of particular sizes. Generally, the particles can be in the form of powder, a granule, or a molded product such as an extrudate having a particle size sufficient to pass through a 2 mesh (Tyler) screen and be maintained on a 400 mesh (Tyler) screen in cases where the catalyst is molded such as by extrusion. The titanium aluminosilicate can be extruded before drying or dried or partially dried and then extruded.

When used as a catalyst, it is desired to incorporate the new crystalline titanium-aluminum-silicate with another material resistant to the temperatures and other conditions employed in organic processes. Such materials include active and inactive materials and synthetic and naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new crystalline titanium silicate, i.e., combined therewith which is active, tends to improve the conversion and/or selectivity of the catalyst in certain organic conversion processes. Inactive materials suitably serve as diluents to control the amount of conversion in a given process so that products can be obtained economically and in an orderly manner without employing other means for controlling the rate of reaction. Normally, crystalline materials have been incorporated into naturally occurring clays, e.g., bentonite and kaolin to improve the crush strength of the catalyst under commercial operating conditions. These materials, i.e., clays, oxides, etc., function as binders for the catalyst. It is desirable to provide a catalyst having good crush strength because in a petroleum refinery the catalyst is often subjected to rough handling which tends to break the catalyst down into powder-like materials which cause problems in processing. These clay binders have been employed for the purpose of improving the crush strength of the catalyst.

Naturally occurring clays that can be composited with the crystalline titanium silicate described herein include the smectite and kaolin families, which families include the montmorillonites such as sub-bentonites and the kaolins in which the main constituent is kaolinite, halloysite, dickite, nacrite or anauxite. Such clays can be used in the raw state after conventional gritting or they can be subjected to additional processing such as calcination, acid treatment or chemical modification.

In addition to the foregoing materials, the crystalline titanium silicate may be composited with matrix materials such as silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix 2 can be in the form of a cogel. The relative proportions of finally divided crystalline metal organosilicate and inorganic oxide gel matrix can vary widely with the crystalline organosilicate content ranging from about 1 to 90 percent by weight and more usually in the range of about 2 to about 50 percent by weight of the composite.

In addition to the above, the crystalline titanium aluminosilicate, ETAS-10, can be incorporated with a matrix by employing in-situ techniques well known in the art. Thus, for example, a forming solution can be prepared as previously described, or the forming solution can contain no aluminum or less aluminum than set forth in Table 3. Quite obviously, it can also contain less silica or caustic.

A mixture is formed, as previously described, and to it is added a reactive clay such as metakaolin. The mixture is blended, seeds may be added and sufficient water introduced in order to be able to spray dry the mixture into microspheres. The microspheres are converted to ETAS1—zeolites by adding an aqueous solution of caustic, caustic silicate or water (if sufficient caustic is present) and crystallizing the same in an autoclave under autogeneous pressure. It is obvious that a portion of the metakaolin can supply a source of aluminum and/or silica.

As is known in the art, it is often desirable to limit the alkali metal content of materials used for acid catalyzed reactions. This is usually accomplished by ion exchange with hydrogen ions or precursors thereof such as ammonium and/or metal cations such as rare earth.

Employing the catalyst of this invention, containing a hydrogenation component, heavy petroleum residual stocks, cycle stocks, and other hydrocrackable charge stocks can be hydrocracked at temperatures between 400° F. and 825° F. using molar ratios of hydrogen to hydrocarbon charge in the range between 2 and 80. The pressure employed will vary between 10 and 2,500 psig and the liquid hourly space velocity between 0.1 and 10.

Employing the catalyst of this invention for catalytic cracking, hydrocarbon cracking stocks can be cracked at a liquid hourly space velocity between about 0.5 and 50, a temperature between about 550° F. and 1100° F., a pressure between about subatmospheric and several hundred atmospheres.

Employing a catalytically active form of a member of the family of zeolites of this invention containing a hydrogenation component, reforming stocks can be reformed employing a temperature between 700° F. and 1000° F. The pressure can be between 100 and 1,000 psig, but is preferably between 200 to 700 psig. The liquid hourly space velocity is generally between 0.1 and 10, preferably between 0.5 and 4 and the hydrogen to hydrocarbon mole ratio is generally between 1 and 20, preferably between 4 and 12.

The catalyst can also be used for hydroisomerization of normal paraffins when provided with a hydrogenation component, e.g., platinum. Hydroisomerization is carried out at a temperature between 200° and 700° F., preferably 300° F. to 550° F., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin isomerization employing temperatures between 30° F. and 500° F.

In order to more fully illustrate the nature of the invention and a manner of practicing the same, the following examples illustrate the best mode now contemplated.

Because of the difficulty of measuring pH during crystallization, it is to be understood that the term pH as used in the specification and claims refers to the pH of the reaction mixture before crystallization diluted 100:1 by weight with water and equilibrated for periods of time ranging from 5-20 minutes.

EXAMPLE 1

A large lot of ETS-10-type gel was prepared for attempted direct aluminum incorporation. 1,256 g of N ® Brand sodium silicate solution was thoroughly mixed and blended with 179 g NaOH and 112 g KF (anhydrous) to form an alkaline silicate solution. To this solution was added 816 g of commercial Fisher titanous chloride solution which was thoroughly mixed and blended with the previous solution using an overhead stirrer. After mixing and initial gel formation, 110 g NaCl and 10 g of calcined ETS-10 seed crystals were added and thoroughly blended into the gel. The "pH" of the gel, using our standard 100:1 dilution, after a 5 min. equilibration period was found to be approximately 10.05, an appropriate level for ETS-10 formation if $TiCl_3$ is employed as the titanium source.

A small portion of the ETS-10 type gel (8-10 g) was removed from the large lot and crystallized at autogenous pressure for 24 hours at 200° C. A crystalline product was obtained which, after washing and drying demonstrated a small amount of an impurity believed to be ETS-4 (~15%) and a dominant phase with the following characteristic XRD lines:

| d-spacing (Angstroms) | $I/I_o$ |
|---|---|
| 14.7 | W-M |
| 7.19 | W-M |
| 4.40 | W-M |
| 3.60 | VS |
| 3.28 | W-M |

EXAMPLE 2

A suspension of potassium fluoride in an alkaline silicate solution was prepared from the following reactants:
502.4 g N ® brand sodium-silicate
80.0 g NaOH
46.4 g KF (anhydrous)

A mixed Al/Ti solution was prepared from the following reactants:
326.4 g Fisher $TiCl_3$ solution
12.8 g $AlCl_3.6H_2O$ To the alkaline silicate solution was slowly added the mixed Al/Ti solution while thoroughly blending using an overhead stirrer and to the resultant apparently homogeneous gel was added 30 g NaCl and 4 g of calcined ETS-10 seed crystals and mixing continued until the mixture again appeared homogeneous.

The seeded titanium-aluminum-silicate reactant mixture was autoclaved without stirring under autogenous pressure for 24 hours at 200° C. In this example, the Al/Ti ratio in the reactant mixture was prepared to be ¼. A crystalline product was obtained whose air-equilibrated d-spacings corresponding to those of Table 1 were:

| d-spacing (Angstroms) | $I/I_o$ |
|---|---|
| 14.85 | W-M |
| 7.21 | W-M |
| 4.42 | W-M |
| 3.61 | VS |
| 3.28 | M-S |

A general upshift in d-spacings, especially on the highest d-spacing was noted in comparison to Table 2 (ETS-10).

EXAMPLE 3

Following the procedure of Example 2 an alkaline silicate solution was prepared from the following reactants:
502.4 g N ® brand sodium-silicate
88.3 g NaOH
46.4 g KF (anhydrous)

A mixed Al/Ti solution was prepared from the following reactants:
326.4 g Fisher $TiCl_3$ solution
25.6 g $AlCl_3.6H_2O$ The alkaline silicate and the mixed Al/Ti solution were thoroughly blended using an overhead stirrer and to the resultant gel was added 20 g NaCl and 4 g of calcined ETS-10 seed crystals.

The seeded titanium-aluminum-silicate reactant mixture was autoclaved under autogenous pressure for 24 hours at 200° C. In this example, the Al/Ti ratio in the reactant mixture was prepared to be ¼. A crystalline product was obtained whose air-equilibrated d-spacings corresponding to those of Table 1 were:

| d-spacing (Angstroms) | I/I$_o$ |
| --- | --- |
| 14.88 | W-M |
| 7.22 | W |
| 4.45 | W-M |
| 3.61 | VS |
| 3.285 | M-S |

Again, several of the d-spacings demonstrate a measurable upshift in comparison to both the prior example with lower aluminum addition as well as the ETS-10 of Table 2.

EXAMPLE 4

Following the general procedure of Example 2 an alkaline silicate solution was prepared from the following reactants:
502.4 g N ® brand sodium-silicate
96.6 g NaOH
46.4 g KF (anhydrous)
A mixed Al/Ti solution was prepared from the following reactants:
326.4 g Fisher TiCl$_3$ solution
38.4 g AlCl$_3$.6H$_2$O The alkaline silicate and the mixed Al/Ti solution were thoroughly blended using an overhead stirrer and to the resultant gel was added 10 g NaCl and 4 g of calcined ETS-10 seed crystals.

The seeded titanium-aluminum-silicate reactant mixture was autoclaved under autogenous pressure for 24 hours at 200° C. In this example, the Al/Ti ratio in the reactant mixture was prepared to be ⅜. A crystalline product was obtained whose air equilibrated d-spacings corresponding to those of Table 1 were:

| d-spacing (Angstroms) | I/I$_o$ |
| --- | --- |
| 14.97 | W-M |
| (7.2 no longer observed) | |
| 4.44 | W-M |
| 3.63 | VS |
| 3.30 | M-S |

Again, several of the d-spacings demonstrate a measurable upshift in comparison to both the prior examples with lower aluminum addition as well as the ETS-10 of Table 2. The peak at 7.2 Å associated with ETS-10 is no longer observed.

EXAMPLE 5

An alkaline silicate solution was prepared from the following reactants:
502.4 g N ® brand sodium-silicate
105.0 g NaOH
46.4 g KF (anhydrous)
A mixed Al/Ti solution was prepared from the following reactants:
326.4 g Fisher TiCl$_3$ solution
51.2 g AlCl$_3$.6H$_2$O The alkaline silicate and the mixed Al/Ti solution were thoroughly blended using an overhead stirrer and to the resultant gel was added 4 g of calcined ETS-10 seed crystals.

The seeded titanium-aluminum-silicate reactant mixture was autoclaved under autogenous pressure for 24 hours at 200° C. In this example, the Al/Ti ratio in the reactant mixture was prepared to be ½. A crystalline product was obtained whose air-equilibrated d-spacings corresponding to those of Table 1

| d-spacing (Å) | I/I$_o$ |
| --- | --- |
| 14.97 | 22 |
| (7.2 no longer observed) | |
| 5.05 | 6 |
| 4.45 | 10 |
| 3.78 | 7 |
| 3.65 | 100 |
| 3.31 | 39 |
| 2.59 | 18 |
| 2.53 | 42 |
| 2.49 | 16 |

Again, several of the d-spacings demonstrate a measurable upshift in comparison to both the prior examples with lower aluminum addition as well as the ETS-10 of Table 2. The peak at 7.2 Å associated with ETS-10 is again no longer observed.

EXAMPLE 6

An alkaline silicate solution was prepared from the following reactants:
502.4 g N ® brand sodium-silicate
121.7 g NaOH
46.4 g KF (anhydrous)
A mixed Al/Ti solution was prepared from the following reactants:
326.4 g Fisher TiCl$_3$ solution
76.8 g AlCl$_3$.6H$_2$O The alkaline silicate and the mixed Al/Ti solution were thoroughly blended using an overhead stirrer and to the resultant gel was added 4 g of calcined ETS-10 seed crystals.

The seeded titanium-aluminum-silicate reactant mixture was autoclaved under autogenous pressure for 24 hours at 200° C. In this example, the Al/Ti ratio in the reactant mixture was prepared to be ¾. A crystalline product was obtained whose air-equilibrated d-spacings corresponding to those of Table 1 were:

| d-spacing (Angstroms) | I/I$_o$ |
| --- | --- |
| 15.06 | W-M |
| (7.2 no longer observed) | |
| 4.46 | W-M |
| 3.67 | VS |
| 3.33 | M-S |

The XRD spectrum has now upshifted to the point where the d-spacings for both the highest (now 15.06 Å) and strongest (now 3.67 Å) peaks are no longer within the limits specified for the ETS-10 of Table 2. The peak at 7.2 Å associated with ETS-10 is again no longer observed.

EXAMPLE 7

An alkaline silicate solution was prepared from the following reactants:
502.4 g N ® brand sodium-silicate
138.4 g NaOH
46.4 g KF (anhydrous)
A mixed Al/Ti solution was prepared from the following reactants:
326.4 g Fisher TiCl$_3$ solution
102.4 g AlCl$_3$.6H$_2$O The alkaline silicate and the mixed Al/Ti solution were thoroughly blended using an overhead stirrer and to the resultant gel was added 4 g of calcined ETS-10 seed crystals.

The seeded titanium-aluminum-silicate reactant mixture was autoclaved under autogenous pressure for 24 hours at 200° C. In this example, the Al/Ti ratio in the reactant mixture was prepared to be 1/1. A crystalline product was obtained whose air-equilibrated d-spacings corresponding to those of Table 1 were:

| d-spacing (Angstroms) | $I/I_o$ |
|---|---|
| 15.25 | 15 |
| (7.2 no longer observed) | |
| 5.07 | 23 |
| 4.455 | 10 |
| 3.89 | 18 |
| 3.68 | 100 |
| 3.33 | 41 |
| 2.587 | 24 |
| 2.536 | 40 |
| 2.507 | 25 |

The XRD spectrum has again upshifted to the point where the d-spacings for both the highest (now 15.25 Å) and strongest (now 3.68 Å) peaks are no longer within the limits specified for the ETS-10 of Table 2. The peak at 7.2 Å associated with ETS-10 is again no longer observed.

CONCLUSIONS FROM EXAMPLES 1–7

The systematic addition of aluminum to ETS-10-like synthesis mixtures results in a systematic increase in the interplanar d-spacings to the point where at sufficient aluminum levels both the largest and the strongest d-spacings rise above the limits for ETS-10 as claimed. Such systematic rises are not only grossly in excess of potential analytical error but are taken as prima facie evidence of elemental framework incorporation in classical zeolite synthesis.

As in the case of all other titanium bearing molecular sieves that we have observed, phase formation of ETAS-10 is pH dependent. In the case of ETAS-10, the appropriate range of pH for formation is dependent on degree of desired aluminum incorporation. At most levels of aluminum incorporation, ETS-4 (described and claimed in U.S. Pat. No. 094,233 filed Sep. 8, 1987) would form if aluminum were not present. The pH utilized for ETAS formation is higher than the level associated with ETS-10 formation. The increased pH allowed with aluminum present allows ETAS-10 to be grown much faster and potentially at lower temperatures than can be accomplished for ETS-10. The pH levels of examples 1–8 are presented as Table 4.

TABLE 4

"pH" of ETAS-10 FORMING REACTANT GELS (10 MIN. EQUILIBRATION)

| EXAMPLE | "pH" | |
|---|---|---|
| 1 (ETS-10) | 10.10 ± .03 | |
| 2 | 10.30 ± .03 | |
| 3 | 10.35 ± .03 | (REGION OF |
| 4 | 10.55 ± .03 | ETS-4 |
| 5 | 10.65 ± .03 | FORMATION |
| 6 | 10.80 ± .03 | IF NO |
| 7 | 10.85 ± .03 | ALUMINUM |
| 8 | 10.80 ± .03 | IS PRESENT) |

EXAMPLE 8

In this example, all pertinent reactants (alumina, titania and silica) employed in examples 1–7 are replaced. The gross reaction ratios resemble example 7 (i.e., the reactant Al/Ti=1).

An alkaline silicate solution was prepared by blending the following reactants:
280 g sodium-disilicate solution (SDS)
45.0 g NaOH
23.2 KF (anhydrous)
30.0 g D.I. $H_2O$ To this solution is slowly added 192.0 g of a 1.27 molal $TiCl_4$ solution in 20 wt. % HCl. After blending, a gel was formed to which 20 g sodium aluminate was added and blended. The resultant mixture was autoclaved under autogenous pressure at 200° C. for 24 hours and a crystalline product was obtained whose relevant XRD lines were compared to the product of example 7, prepared using different silica, titania and alumina sources. The comparison of these patterns indicates essentially identical ETAS-10 products.

| PRODUCT OF EXAMPLE 7 d-SPACING (Å) ($I/I_o$) | | PRODUCT OF EXAMPLE 8 d-SPACING (Å) $I/I_o$ | |
|---|---|---|---|
| 15.25 | W-M | 15.25 | W-M |
| (7.2 no longer observed) | | | |
| 4.45 | W-M | 4.45 | W-M |
| 3.68 | VS | 3.68 | VS |
| 3.33 | M-S | 3.33 | M-S |

This example demonstrates that ETAS-10 may be prepared from various silica, titanium and aluminum sources.

EXAMPLE 9

This example establishes that as the aluminum content of the ETAS-10 reaction mixture rises, the aluminum content of the gross product rises proportionally. As is common in molecular sieve synthesis, the crystalline product of examples 1–8 contained mixed phases, with ETAS-10 phases predominating (examples 2–8). The most common contaminant noted was ETS-4.

Several samples washed and dried (from examples 1, 2, 5 and 7) which contained a preponderance (estimated at >85%) of the desired crystalline phase were analyzed by X-ray fluorescence to determine the composition of the gross product.

This analysis revealed:

| PRODUCT OF | WT. % $Al_2O_3$ | Al/Ti (REACTANTS) | Al/Ti GROSS PRODUCT |
|---|---|---|---|
| EXAMPLE 1 | 0.28 | 0* | 0.02 |
| EXAMPLE 2 | 1.26 | 0.125 | 0.10 |
| EXAMPLE 5 | 3.89 | 0.500 | 0.33 |
| EXAMPLE 7 | 9.70 | 1.00 | 0.88 |

* = other than reactant impurities

It is common in zeolite synthesis that the incorporation of an added element is not necessarily linear with addition. However, incorporation often appears as a linear function of the ratios of several reactants.

This example establishes that added aluminum is substantially integrated into the gross reaction product of ETAS-10 synthesis mixtures. In all cases, the exchangeable cationic content of the reaction products approximated 2(Ti)+1(Al).

Thus, if titanium (Ti) bears a charge of −2 and aluminum (Al) bears a charge of −1, the ratios of counterbalancing cations to 2 times the titanium content plus 1 times the aluminum content and should approach 1.0 in a pure material.

The purest sample, the product of Example 5, was found to demonstrate the following cation/site balance as synthesized:

$(Na+K)/(2Ti+Al) = 0.97$

These materials are easily exchangeable with cationic species such as ammonium, with little or no change in XRD spectrum as is obvious from the following table which shows ammonium exchange. Magnesium and calcium data will be later presented.

TABLE 5
COMPOSITION AND XRD PEAK POSITIONS OF AS-SYNTHESIZED AND HIGHLY AMMONIUM EXCHANGED ETS-10 AND THE PRODUCTS OF EXAMPLES 5 AND 7

| | ELEMENTAL COMPOSITION (WT %) | | XRD PEAK POSITION (Å) | | | |
|---|---|---|---|---|---|---|
| | | | AS SYNTHESIZED | | NH₄ EXCHANGED | |
| | AS-SYNTHESIZED | NH₄ EXCHANGED | d-spacing (Å) | I/I₀ | d-spacing (Å) | I/I₀ |
| ETS-10 | | | | | | |
| $SiO_2$ | 61.40 | 70.12 | 14.7 | W-M | 14.75 | W-M |
| $TiO_2$ | 22.72 | 27.12 | 7.20 | W-M | 7.20 | W-M |
| $Al_2O_3$ | 0.28 | 0.26 | 4.41 | W-M | 4.415 | VS |
| $Na_2O$ | 13.75 | 1.58 | 3.60 | VS | 3.60 | W-M |
| $K_2O$ | 3.3 | 0.07 | 3.28 | W-M | 3.28 | W-M |
| (Na + K)/2Ti = 0.89 (as synthesized) | | | | | | |
| (Na + K)/2Ti = .08 (after exchange) | | | | | | |
| EXAMPLE 5 | | | | | | |
| $SiO_2$ | 58.74 | 67.77 | 14.96 | W-M | 14.91 | W-M |
| $TiO_2$ | 18.48 | 21.83 | — | — | 7.24 | W-M |
| $Al_2O_3$ | 3.89 | 6.71 | 4.45 | W-M | 4.43 | W-M |
| $Na_2O$ | 12.51 | 2.80 | 3.65 | VS | 3.62 | VS |
| $K_2O$ | 5.56 | 1.24 | 3.31 | M-S | 3.30 | M-S |
| (Na + K)/(2Ti + Al) = 0.97 (as synthesized) | | | | | | |
| (Na + K)/(2Ti + Al) = 0.17 (after exchange) | | | | | | |
| EXAMPLE 7 | | | | | | |
| $SiO_2$ | 54.52 | 61.77 | 15.25 | W-M | 15.30 | W-M |
| $TiO_2$ | 17.23 | 19.72 | — | — | — | |
| $Al_2O_3$ | 9.70 | 11.30 | 4.45 | W-M | 4.40 | W-M |
| $Na_2O$ | 14.93 | 5.25 | 3.68 | VS | 3.68 | VS |
| $K_2O$ | 4.18 | 1.78 | 3.33 | M-S | 3.33 | M-S |

(Na + K)/(2Ti + Al) = 0.92 (as synthesized)
(Na + K)/(2Ti + Al) = 0.29 (after exchange)

EXAMPLE 10

The product of Example 5 was contacted with a 10% by weight solution of magnesium chloride for ½ hour at 100° C. After washing with deionized water and calcining at 500° C. for 1 hour, and re-equilibrated in air, the crystalline product had the following d-spacings:

| d-spacings (Å) | I/I₀ |
|---|---|
| 14.97 | 23 |
| 7.20 (no longer observed) | |
| 5.01 | 6 |
| 4.43 | 10 |
| 3.78 | 6 |
| 3.63 | 100 |
| 3.31 | 28 |
| 2.540 | 26 |
| 2.479 | 10 |

The elemental composition was as follows (wt. %):

| | |
|---|---|
| $SiO_2$ | 60.76 |
| $TiO_2$ | 18.96 |
| $Al_2O_3$ | 5.60 |
| $Na_2O$ | 5.82 |
| $K_2O$ | 3.62 |
| MgO | 5.47 |
| 2Mg + Na + K/(2Ti + Al) = 0.92 | |

EXAMPLE 11

The product of Example 7 was contacted with a 10% by weight solution of magnesium chloride for ½ hour at 100° C. After washing with deionized water and calcining at 500° C. for 1 hour, and re-equilibrated in air, the crystalline product had the following d-spacings:

| d-spacings (Å) | I/I₀ |
|---|---|
| 15.06 | 16 |
| 7.20 (no longer observed) | |
| 5.08 | 26 |
| 4.43 | 8 |
| 3.66 | 100 |
| 3.32 | 30 |
| 2.564 | 24 |
| 2.535 | 20 |
| 2.493 | 11 |

The elemental composition was as follows (wt. %):

| | |
|---|---|
| $SiO_2$ | 56.20 |
| $TiO_2$ | 17.30 |
| $Al_2O_3$ | 9.85 |
| $Na_2O$ | 9.32 |
| $K_2O$ | 3.09 |
| MgO | 4.64 |
| 2Mg + Na + K/(2Ti + Al) = 0.95 | |

EXAMPLE 12

The product of Example 5 was contacted with a 5% by weight solution of calcium chloride dihydrate for ½ hour at 100° C. a total of 2 times. After washing with deionized water and calcining at 200° C. for 1 hour, and re-equilibrated in air, the crystalline product had the following d-spacings:

| d-spacings (Å) | $I/I_o$ |
|---|---|
| 14.9 | W-M |
| 7.2 (not observed) | |
| 4.42 | W |
| 3.615 | VS |
| 3.290 | M-S |

The elemental composition was as follows (wt. %):

| | |
|---|---|
| $SiO_2$ | 59.93 |
| $TiO_2$ | 19.23 |
| $Al_2O_3$ | 5.69 |
| $Na_2O$ | 1.61 |
| $K_2O$ | 2.76 |
| CaO | 11.31 |
| 2Ca + Na + K/(2Ti + Al) = 0.92 | |

EXAMPLE 13

While the aluminum coordination may be inferred to be tetrahedral from the cation balance of the previous examples, $^{27}Al$ NMR may be employed to more definitively establish whether Al is tetrahedral or octahedral and whether it is "framework" aluminum as would be expected if it were integrated into a molecular sieve. The $^{27}Al$ MAS NMR spectrum of a sample of ETAS-10 containing approximately 7.2 wt. % $Al_2O_3$ shows a peak at 58 ppm which is indicative of tetrahedral framework aluminum. No octahedral aluminum was observed. A small peak at −6 ppm being interpreted as a spinning side band.

This example establishes that essentially all aluminum incorporated into the gross reaction product of ETAS-10 reaction mixtures forms as tetrahedral, framework type sites. This example does not eliminate the possibility of mixed phases, including the possibility of an alumino-silicate zeolite co-forming with ETS-10 in ETAS-10 reaction mixtures.

EXAMPLE 14

The ETAS-10 sample of the previous example was subjected to standard SEM/EDS analysis. The morphology of the dominant crystal species (established from XRD to be ETAS-10) was found to be platy masses, notably different than the nearly cubic crystals characteristic for ETS-10. Spot elemental analysis of the sample indicated that aluminum was uniformly associated with crystals bearing both high titanium and high silicon levels. No masses or crystals containing significant aluminum were observed which did not also contain substantial titanium observed, i.e., no alumino-silicate phases were observed.

This example establishes that aluminum incorporated into the gross reaction product of ETAS-10 reaction mixtures forms as crystalline titanium-aluminum-silicates and not as a mixture of crystalline titanium-silicates and classical alumino-silicate zeolites.

CONCLUSIONS FROM EXAMPLES 9-14

Examples 9-14 established that aluminum is incorporated as a tetrahedral framework atom in a crystalline titanium-aluminum-silicate phase during the crystallization of ETAS-10 reaction mixtures.

EXAMPLE 15

The gross products of Examples 1, 5 and 8 were ammonium exchanged, activated under vacuum at 350° C. and exposed to xenon at 530 torr pressure. The xenon treated samples were then subjected to $^{129}Xe$ NMR. While some crystallinity was lost, the ETS-10 of example 1 shows a clean spectrum with a peak a 119.3 ppm. Aluminum incorporated dramatically upshifts this peak position. The product of example 5 shows a clear single peak at 137.6 ppm, establishing that the ETAS-10 of example 5 is a single crystalline phase, easily differentiated from the ETS-10 of example 1 by a standard analytical technique. Substantially increasing the aluminum level in example 8 only raises the primary peak an additional 2 ppm (to 139.8), clearly demonstrating that the characteristic peak locations for ETAS-10 cover a relatively narrow region, far removed from that characteristic for ETS-10, irrespective of incorporated aluminum level under the test conditions stated.

EXAMPLE 16

The $^{29}Si$ MAS NMR spectrum of ETS-10 and the ETAS-10 of Example 10 were compared. The ETS-10 spectrum indicates three distinct silica environments as manifested by peaks at −104, −96 and −94 ppm. The ETAS-10 spectrum demonstrates these three environments plus at least two new heavily populated environments as manifested by additional significant peaks at −92 and −90 ppm. Such new environments would be expected if silica and alumina were integrated into the same crystal. Having established in the previous example that ETAS-10 is a single phase, it is evident that aluminum incorporation impacts the silica sites of the structure and that an additional standard analytical method may be employed to readily differentiate ETS-10 from ETAS-10.

CONCLUSIONS FROM EXAMPLES 15 & 16

These two examples demonstrate that the ETAS-10 samples of the previous examples represent a single distinct phase which can be readily differentiated from ETS-10 by a variety of standard analytical techniques.

EXAMPLE 17

The ETAS-10 sample of Example 13 was activated under vacuum at 200° C. and exposed to 1,3,5-trimethylbenzene. Under these conditions, an adsorptive capacity of 6.4 wt. % was observed for this as synthesized, mixed Na+/K+ material. As synthesized, mixed Na+/K+ ETS-10 has been observed to be essentially non-adsorptive towards 1,3,5-trimethylbenzene, the molecule being slightly larger than the as synthesized ETS-10 pore opening.

This example demonstrates that the pore opening of ETAS-10 is somewhat larger than ETS-10. This is consistent with the lattice expansion noted in examples 1-8 as aluminum is incorporated into the reaction mixture.

EXAMPLE 18

The products of Examples 1 and 5 were air equilibrated and dehydrated in a TGA apparatus at 10° C./min. ETS-10 is a weak, type I moderate adsorbent towards small polar molecules and began rapidly losing water at a temperature slightly above 100° C. Under equivalent conditions, the ETS-10 of example 5 lost the preponderance of adsorbed water only after a pronounced drop-off point at approximately 250° C. This demonstrates that the incorporation of even 3.9 wt. % $Al_2O_3$ profoundly alters the internal electrostatic field of the material, binding small polar molecules such water much more tightly.

CONCLUSIONS FROM EXAMPLES 17 AND 18

These two examples demonstrate that ETAS-10 has a somewhat larger pore and grossly different internal electrostatic environment than ETS-10. These two points are completely consistent with the lattice expansion observed in examples 1-8 and the distinct xenon shift (probably indicative of much stronger xenon/site interactions) of Example 14 and the new silica environments of Example 16.

EXAMPLES 19-23

These examples demonstrate that the preparation of ETAS-10 is not as simple as the addition of an aluminum source to a "standard" ETS-10 synthesis mixture followed by crystallization. Specific pH levels, depending upon desired degree of aluminum incorporation, must be in place while the reactant gel is formed. These examples further demonstrate that if aluminum addition is made at the wrong gel pH, formation of ETAS-10 by rebalancing pH to the level appropriate for ETAS-10 formation is difficult at best.

EXAMPLE 19

A 200 g sample of the ETS-10 gel of example 1 was segregated from the larger lot and to this sample was added 20.8 g of reagent grade $AlCl_3 \cdot 6H_2O$ such that the ratio of Al/Ti was approximately 1.0, as in examples 7 and 8. The sample was thoroughly blended and the "pH" of the gel, after a 10 min. equilibration period, was found to be approximately 7.8, well below the region associated with ETS-10 or ETAS-10 formation. Three small samples (8-10 g each) were withdrawn from this now aluminum bearing lot and crystallized under the conditions of the previous example for 1, 3 and 7 days, respectively. After washing and drying as above, XRD powder patterns revealed the reaction products to be essentially amorphous (approximately 10% crystallinity) with the small amount of crystallized product devoid of ETS-10, ETAS-10 or related phases in all cases.

EXAMPLE 20

A 200 g sample of the ETS-10 gel of Example 1 was segregated from the larger lot and to this sample was added 6.7 g of $Al_2O_3 \cdot 6H_2O$ such that the ratio of Al/Ti was approximately 1.0, as in examples 7 and 8. The sample was thoroughly blended and the "pH" of the gel, after a 10 min. equilibration period, was found to be approximately 10.1, essentially unchanged from the raw ETS-10 gel. Three small samples (8-10 g each) were withdrawn from this now aluminum bearing lot and crystallized under the conditions of the previous example for 1, 3 and 7 days, respectively. After washing and drying as above, XRD powder patterns revealed the reaction products to be highly crystalline ETS-4, essentially devoid of ETS-10, ETAS-10 or related phases.

EXAMPLE 21

A 200 g sample of the ETS-10 gel of Example 1 was segregated from the larger lot and to this sample was added 7.1 of $NaAlO_2$ such that the ratio of Al/Ti was approximately 1.0, as in examples 7 and 8. The sample was thoroughly blended and the "pH" of the gel, after a 10 min. equilibration period, was found to be approximately 10.7, an apparently nearly ideal level for ETAS-10 formation at this aluminum content. Three small samples (8-10 g each) were withdrawn from this now aluminum bearing lot and crystallized under the conditions of the previous example for 1, 3 and 7 days, respectively. After washing and drying as above, XRD powder patterns revealed the reaction products to be highly crystalline ETS-4, essentially devoid of ETS-10, ETAS-10 or related phases.

EXAMPLE 22

To the remainder of the relatively low (for ETAS-10 formation) alkalinity mixture of Example 20 was added 3.5 g of NaOH with the resultant mixture thoroughly blended by over-head stirrer. The resultant "pH" was raised to approximately 10.75. A small portion of the sample (8-10 g) was crystallized for 24 hours at 200° C. as above. A crystalline product was obtained which was predominantly ETS-4 (estimated to be approximately 80%) with no trace of any ETS-10 or ETAS-10-like phase observed.

EXAMPLE 23

To the remainder of the remainder of the nearly ideal (for ETAS-10 formation) alkalinity mixture of Example 19 was added an additional 1.0 g of NaOH with the resultant mixture thoroughly blended by over-head stirrer. The resultant "pH" was raised to approximately 10.80. A small portion of the sample (8-10 g) was crystallized for 24 hours at 200° C. as above. A crystalline product was obtained which was predominantly ETS-4 (estimated to be approximately 80%) with no trace of any ETS-10 or ETAS-10-like phase observed.

EXAMPLE 24

A $TiCl_4$ solution was prepared by mixing and blending the following reactants with a magnetic stirrer:

| | |
|---|---|
| Conc. HCl | 3221 g |
| $TiCl_4$ | 1480 g |
| Deionized $H_2O$ | 1299 g |

An alkaline silicate solution was prepared by mixing and blending the following reactants with an overhead stirrer:

| | |
|---|---|
| N ® Brand sodium silicate | 5580 g |
| NaOH | 1460 g |
| KF | 416 g |
| Deionized $H_2O$ | 308 g |

A portion of the $TiCl_4$ solution (3,456 g) was mixed and blended with the entirety of the alkaline silicate solution using an overhead stirrer. To this mixture, 376 g of Satintone ® No. 2 metakaolin was added and the mixture was thoroughly blended using an overhead stirrer until the resulting gel appeared homogeneous. To this gel was added 54.0 grams of ETAS-10 seeds which had been calcined at 350°-500° C. The gel was again blended using an overhead stirrer until it appeared homogeneous.

To the above gel, 1000 grams of deionized water was added while it was being mixed, using an overhead stirrer in order to produce a gel having a viscosity of about 500-1000 centipoises (Brookfield).

The gel was spray-dried using a Stork-Bowen nozzle dryer at the following conditions:

| | |
|---|---|
| outlet temperature | 130–135° C. |
| inlet temperature | 370° C. |
| feed rate | 300 ml/min. |
| pressure drop | 5.5 psi |
| nozzle number | 08 |

The product yield was 3530 grams of fluidizable microspheres largely in a size range of minus 60 plus 325 (Tyler Sieve) having the following molar ratios:
Si/Ti=6.85
Al/Ti=0.88

The microspheres were calcined in air at 400° C. for approximately one hour.

One kilogram of the calcined microspheres was mixed with an equal weight of an aqueous solution containing 2.0 wt. % NaOH and 1.0 wt. % KOH. The mixture was autoclaved under autogenous pressure without stirring at 200° C. for 24 hours. The crystallized product was wet screened to minus 100 plus 325 size (Tyler Sieve) to yield 300 grams of product.

The screened product was boiled for 15 minutes in two liters of deionized water, vacuum filtered and dried at 125° C. for two hours.

Powder X-ray analysis indicated that ETAS-10 was formed of about 70% crystallinity.

EXAMPLE 25

Preparation Procedure of ETAS-10/Attagel-36 ® Aggregates

ETAS-10 powder was prepared by the following procedure and formulated into aggregates.

A TiCl$_4$ solution was prepared by mixing and blending the following reactants with a magnetic stirred.

| | |
|---|---|
| Conc. HcL | 1610.7 g |
| TiCL$_4$ | 739.8 g |
| Deionized H$_2$O | 649.5 g |

An alkaline silicate solution was prepared by mixing and blending the following reactants with an overhead stirrer.

| | |
|---|---|
| SDS silicate | 3487.5 g |
| | (14.4 Wt. % Na$_2$O & |
| | 27.1 wt. % SiO$_2$) |
| NaOH | 556.3 g |
| KF | 261.0 g |

A portion of the TiCL$_4$ solution (2160. g) was mixed and blended with the entirety of the alkaline silicate solution using an overhead stirrer. To this mixture, a solution of sodium aluminate, prepared by dissolving 115.3 g of NaAlO$_2$ in 393.8 g deionized H$_2$O, was added and blended. To this mixture was added 33.8 grams of ETAS-10 seeds. The mixture was thoroughly blended using an overhead stirrer until it appeared homogeneous. The gel was then placed in a Waring Blendor ® and blended for 10 minutes. The "pH" of the gel using our standard 100:1 dilution technique was found to be 10.9 after a 15 min. equilibration period. The mixture was autoclaved under autogenous pressure without stirring at 200° C. for 24 hours. The product was washed with deionized (DI) H$_2$O, vacuum filtered and dried at 200° C. to yield ETAS-10 powder.

The following materials were used to prepare the aggregates:

| | |
|---|---|
| 500 g | ETAS-10 powder |
| 55 g | Attagel ® 36 |
| 111 g | Starch (Penford ® Gum 280 - Penick and Ford, Limited) |
| Deionized Water | 370 grams |

A starch solution, added as a pore-former, was prepared by mixing 111 g of the above starch with 320 g deionized water and cooking in a steamer at 212° F. for 20 minutes. This step was used to: a) completely dissolve starch in water; and b) improve starch/water rheologies. The cooked starch was cooled to room temperature before being used as the binder for the formation of ETAS-10/Attagel-36 ® aggregates.

Attagel-36 ® is a commercially available colloid grade Attapulgus clay. The dehydration temperature of Attagel-36 ® is less than the critical temperature of ETAS-10 (1020–1110° F.). Typical analysis of Attagel-36 ® is:

68.0 wt. % SiO$_2$
12.0 wt. % Al$_2$O$_3$
10.5 wt. % MgO
5.0 wt. % FE$_2$O$_3$
1.7 wt. % CaO
1.0 wt. % P$_2$O$_5$
1.0 wt. % K$_2$O
0.7 wt. % TiO$_2$

The strong particle integrity of Attagel-36 ® results in the high attrition resistance of the ETAS-10 Attagel-36 ® aggregates.

The aggregates were prepared by blending 500 g ETAS-10 with 55 g Attagel-36 ® in a single speed sigma blade mixer for 15 minutes. When the blend was uniformly mixed (~10 minutes), 430 g cooked starch and 50 g deionized water was added to the blend and mixed for another 20 minutes.

The ETAS-10/Attagel-36 ® Starch blend had a dough-like consistency and were molded into several 2–3 inches diameter cakes and placed in an open cordierite tray before calcination. The calcination was conducted in muffle furnace at 435° F. for 60 minutes, then 660° F. for 60 minutes, and finally 900° F. for 75 minutes. The slow calcination of the blend was used to prevent temperature increases during the calcination step.

Finally, the light brown ETAS-10/Attagel-36 ® cakes were crushed and wet screened to minus 20 plus 60 mesh (Tyler). The final product had a surface area by mercury porosimetry of 25.7 m$^2$/g, a bulk density of 0.45 g/ml and a pore volume of 0.89 cc/g.

Examples 26–36 demonstrate that the fundamental chemistry of ETS-10-type formation is altered by the drying/calcination of the reactant gel prior to crystallization. Example 26 represents a relatively "standard" 1/2:1 Al/Ti ETAS-10 preparation grown under standard conditions (i.e., 200° C. under autogenous pressure for 24 hours).

EXAMPLE 26

A TiCl$_4$ solution was prepared by mixing and blending the following reactants with an magnetic stirrer:

| Conc. HCL | 1610.7 g |
|---|---|
| TiCl$_4$ | 739.8 g |
| Deionized H$_2$O | 649.5 g |

An alkaline silicate solution was prepared by mixing and blending the following reactants with an overhead stirrer:

| SDS silicate | 1359.0 g (14.4 wt. % Na$_2$O & 27.1 wt. % SiO$_2$) |
|---|---|
| NaOH | 222.5 g |
| KF | 104.4 g |

A portion of the TiCl$_4$ solution (864.0 g) was mixed and blended with the entirety of the alkaline silicate solution using an overhead stirrer. To this mixture, a solution of sodium aluminate, prepared by dissolving 46.13 g of NaAlO$_2$ in 157.5 g deionized H$_2$O, was added and blended. To this mixture was added 13.5 g of calcined ETAS-10 seeds. The mixture was thoroughly blended using an overhead stirrer until it appeared homogenous. The "pH" of the gel using our standard 100:1 dilution technique wa found to be 10.9 after a 10 min. equilibrium period.

Ten grams of the gel was loaded into a small (approx. 15 cc) autoclave and reacted under autogenous pressure for 24 hours at 200° C. After washing and filtering, a crystalline product was obtained whose XRD powder pattern indicated a composition of approximately 4/1 ETAS-10 to ETS-4. At a "pH" of 10.9, we are approaching the transition point for ETAS-10 (at the stated aluminum level) and ETS-4. Even a relatively minor elevation in alkalinity would result in essentially pure ETS-4.

EXAMPLE 27

An identical ten gram portion of the gel of Example 26 was loaded into a small (approx. 15 cc) autoclave and reacted under autogenous pressure for 24 hours at 160° C. After washing and filtering, an amorphous product was obtained with no trace of crystallinity observed in the XRD powder pattern. This example indicates that essentially no ETAS-10 growth is possible in 24 hours using "standard" gel at the maximum alkalinity. Rates of molecular sieve formation are generally controlled by temperature and alkalinity. In order to substantially reduce reaction temperature, a means of substantially increasing usable alkalinity must be identified.

EXAMPLE 28

The gel of Examples 26 and 27 was poured into steel trays and dried at 200° C. overnight. The dried gel was ground to a fine powder (nominally −200 mesh) and then calcined in a muffle furnace for one hour at 500° C.

A four gram portion of this sample was loaded into a small (approx. 15 cc) autoclave, to which was added 4 g of 1 wt. % NaOH solution. The calcined gel/caustic solution mixture was autoclaved at 160° C. for 24 hours. After washing and filtering, a product of moderate crystallinity (approx. 50%) was obtained whose XRD powder pattern was consistent with ETAS-10 at the 1/2:1 Al/Ti framework ratio with the strongest peak at 3.63 Angstroms. No ETS-4 contamination was observed. In the gel based system, significant if not total ETS-4 formation would be expected with the addition of this alkali to the gel of Examples 26 and 27. Not only does drying/calcination of the gel before crystallization suppress ETS-4 formation, but the increase in usable alkalinity produced significant growth at a temperature where no growth was observed for unstabilized gel (Example 27).

EXAMPLE 29

A four gram portion of the calcined gel of Example 28 was loaded into a small (approx. 15 cc) autoclave, to which was added 4 g of 3 wt. % NaOH solution. The calcined gel/caustic solution mixture was autoclaved at 160° C. for 24 hours. After washing and filtering, a product of moderate crystallinity (approx. 50%) was obtained whose XRD powder pattern was consistent with ETAS-10 at the 3/4:1 Al/Ti framework ratio with the strongest peak at 3.66 Angstroms. No ETS-4 contamination was observed. In the gel based system total ETS-4 formation would be expected with the addition of this high level of alkali to the gel of Examples 26 and 27. Instead of forming ETS-4, the calcined gel system is incorporating any available excess aluminum into an ETAS-10 phase with higher content than would be possible using the initial gel. Not only does drying/calcination of the gel before crystallization suppress ETS-4 formation and enhance aluminum framework incorporation, but the increase in usable alkalinity produced significant growth at a temperature where no growth was observed for unstabilized gel (Example 27).

EXAMPLE 30

A four gram portion of the calcined gel of Example 28 was loaded into a small (approx. 15 cc) autoclave, to which was added 4 g of 5 wt. % NaOH solution. The calcined gel/caustic solution mixture was autoclaved at 160° C. for 24 hours. After washing and filtering, a product of moderate to good crystallinity (approx. 70%) was obtained whose XRD powder pattern was consistent with ETAS-10 at the 7/8:1 Al/Ti framework ratio with the strongest peak at 3.68 Angstroms. No ETS-4 contamination was observed. In the gel based system total ETS-4 formation would be expected with the addition of this level of alkali to the gel of Examples 26 or 27. Instead of forming ETS-4, the calcined gel system is incorporating any available excess aluminum into an ETAS-10 phase with higher content than would be possible using the initial gel. Not only does drying/calcination of the gel before crystallization suppress ETS-4 formation and enhance aluminum framework incorporation, but the increase in usable alkalinity produced substantial growth at a temperature where no growth was observed for unstabilized gel (Example 27).

EXAMPLE 31

A four gram portion of the calcined gel of Example 28 was loaded into a small (approx. 15 cc) autoclave, to which was added 4 g of 10 wt. % NaOH solution. The calcined gel/caustic solution mixture was autoclaved at 160° C. for 24 hours. After washing and filtering, a product of excellent crystallinity (approx. 90%) was obtained whose XRD powder pattern was consistent with ETAS-10 at the 1:1 Al/Ti framework ratio with the strongest peak at 3.69 Angstroms. Only trace ETS-4 contamination was observed. In the gel based system total ETS-4 formation would be expected with the addition of this level of alkali to the gel of Examples 26 and 27. Instead of forming ETS-4, the calcined gel system is incorporating any available excess aluminum into an ETAS-10 phase with higher content than would be possible using the initial gel. Not only does drying/calcination of the gel before crystallization suppress ETS-4 formation and enhance aluminum framework incorporation, but the increase in usable alkalinity produced essentially complete crystallization at a temperature where no growth was observed for unstabilized gel (Example 27).

EXAMPLE 32

To a 5 gram sample of microspheres of composition essentially identical to the gel of Example 26 which was dried at 200° C. for 1 hour was added 5 g of deionized $H_2O$ in a small (approx. 15 cc) autoclave. The mixture was autoclaved at 200° C. for 24 hours under autogenous pressure. After washing, filtering and drying, XRD powder patterns of this sample indicated that ETAS-10 had begun to substantially crystallize and had reached approximately the 20% level in this time frame. The partially crystallized microspheres had maintained some degree of integrity during autoclaving in that the product was gritty and not a fine powder as observed in related gel synthesis. No ETS-4 contamination was observed.

EXAMPLE 33

To a 5 gram sample of microspheres of composition essentially identical to the gel of Example 26 which was calcined at 500° C. for 1 hour was added 5 g of deionized $H_2O$ in a small (approx. 15 cc) autoclave. The mixture was autoclaved at 200° C. for 24 hours under autogenous pressure. After washing, filtering and drying, XRD powder patterns of this sample indicated that ETAS-10 had begun to substantially crystallize and had reached approximately the 50% level in this time frame. The partially crystallized microspheres had maintained some degree of integrity during autoclaving in that the product was gritty and not a fine powder as observed in related gel synthesis. No ETS-4 contamination was observed. Calcination apparently increased the conversion efficiency of the microspheres when this is compared to the previous example.

EXAMPLE 34

To a 180 gram sample of the dried microspheres of Example 32 was added 180 g of a 12.5 wt. % SDS alkaline silicate solution in deionized water. The mixed solution was prepared under the assumption that the added alkalinity would increase reaction rate while the solution silica would help maintain particulate integrity. The mixture was autoclaved at 200° C. for 24 hours under autogenous pressure in an approximately 320 cc autoclave. After wet screening the product to 100/400 mesh, washing, filtering and drying, XRD powder patterns of this sample indicated that ETAS-10 had begun to crystallize and had reached approximately the 33% level in this time frame. The partially crystallized microspheres had maintained some degree of integrity during autoclaving in that the 100/400 mesh fraction constituted the majority of the recovered product. Very little ETS-4 contamination was observed.

EXAMPLE 35

To a 180 gram sample of the calcined microspheres of Example 33 was added 180 g of a 12.5 wt. % alkaline silicate solution of Example 34. The mixed solution was prepared under the assumption that the added alkalinity would increase reaction rate while the solution silica would help maintain particulate integrity. The mixture was autoclaved at 200° C. for 24 hours under autogenous pressure in an approximately 320 cc autoclave. After wet screening the product to 100/400 mesh, washing, filtering and drying, XRD powder patterns of this sample indicated that ETAS-10 was well crystallized, having reached approximately the 85% level in this time frame. Calcination apparently increased the conversion efficiency of the microspheres when this is compared to the previous example. The crystallized microspheres had maintained some degree of integrity during autoclaving in that the 100/400 mesh fraction constituted the majority of the recovered product. Very little ETS-4 contamination was observed.

EXAMPLE 36

In an attempt to ascertain if the in situ technique would be applicable to large particles, a gel essentially identical to that of Example 26 was loaded into stainless steel pans and dried at 200° C. overnight. A portion of the sample was manually crushed and sized at 20/50 and calcined in a muffle furnace at 500° C. for one hour.

To a 150 gram sample of calcined 20/50 particles was added 150 g of a 12.5 wt. % SDS alkaline silicate solution in deionized water. The mixed solution was prepared under the assumption that the added alkalinity would increase reaction rate while the solution silica would help maintain particulate integrity. The mixture was autoclaved at 200° C. for 24 hours under autogenous pressure in an approximately 320 cc autoclave. After wet screening the product at 20/50 mesh, washing, filtering and drying, XRD powder patterns of this sample indicated that ETAS-10 was well crystallized, having reached approximately the 70% level in this time frame. The 20/50 mesh fraction constituted the majority of the recovered product. Very little ETS-4 contamination was observed.

While both the microspheres of Example 34 and the 20/50 mesh particles of Example 35 maintained their size and some degree of mechanical integrity, some powdering was observed when the materials were slurried with water. Such powdering may cause substantial back pressure problems in actual ion-exchange columns. As such, alternate in situ techniques were investigated.

EXAMPLE 37

One hundred grams of the 20/50 mesh starting granules of calcined gel were loaded in a steaming column and reacted in 100% steam for 24 hours at 250° C. During this treatment, the particles gained considerable mechanical strength. XRD powder patterns of the material indicated that ETAS-10 had begun to grow, reaching the 10–15% level in this time frame.

CONCLUSIONS

ETAS-10 is a new wide pored titanium-aluminum-silicate molecular sieve constructed from di-charged octahedral titanium, mono-charged tetrahedral aluminum and neutral tetrahedral silica units. No such sieve containing both charged octahedral and charged tetrahedral sites is noted in the prior art.

While structurally related to the titanium-silicate molecular sieve ETS-10, incorporation of aluminum into the framework structure systematically expands the lattice planes and pore openings. The incorporated aluminum generates strongly polarized sites which, in concert with the di-charged titanium sites, generate a unique intercrystalline environment.

The synthesis of ETAS-10 is similar to that of ETS-10 with the exception that a soluble aluminum source is added to the synthesis mixture and the "pH" must be adjusted upward at the time of gel formation depending upon aluminum level. It also appears that this elevated alkalinity must be present at or shortly after gel formation. ETS-10 contains incidental amounts of aluminum typically 0.5 wt. % as $Al_2O_3$ on a volatile free basis, as a consequence of less than perfect reactant purity, especially contamination in commercial sodium silicates. ETAS-10 contains substantial amounts of aluminum (about 0.5 to 10 wt. % or more as $Al_2O_3$) as a consequence of the intentional incorporation of aluminum into the sieve by the addition of an aluminum source to the reaction mixture.

ETAS-10 represents a new composition of matter which can be differentiated from ETS-10 by a variety of standard analytical techniques.

GLOSSARY OF TERMS

DEFINITIONS, PROCEDURES AND REACTANTS EMPLOYED

N® Brand Sodium Silicate is a commercial solution obtained from PQ Corporation. Typical lot analysis would include approximately 29 wt. % $SiO_2$ and 9 wt. % caustic as $Na_2O$, the balance being water.

SDS (sodium di-silicate) is a commercially used sodium silicate solution in Engelhard FCC operations and was obtained internally. Typically lot analysis would include approximately 27 wt. % $SiO_2$ and 14 wt. % caustic as $Na_2O$, the balance being water.

Potassium fluoride (KF) was obtained on an anhydrous basis from Pfaltz and Bauer, Inc. Solubility of fluorides in the silicate solutions employed is such that they are only partially dissolved upon mixing, the balance appearing suspended in the silicate mixtures.

Caustic (NaOH) was obtained as an essentially anhydrous material from Fisher Scientific.

Titanous Chloride solution ($TiCl_3$) was obtained from Fisher Scientific as 20 wt. % $TiCl_3$ in 20 wt. % HCl, the balance being water yielding a net molality of 1.25–1.30 $TiCl_3$.

Titanium tetrachloride ($TiCl_4$) was obtained as a +99 wt. % liquid from Alfa-Ventron.

Aluminum trichloride as the hexa-aquated salt ($AlCl_3$ $6H_2O$) was obtained from Fisher Scientific. The aluminum trichloride is completely dissolved in the titanous chloride solution before the mixed metal solution is blended into alkaline silicate mixtures.

Sodium aluminate ($NaAlO_2$) was obtained on an essentially anhydrous basis from Pfaltz and Bauer, Inc. Where this reactant is employed as the aluminum source, sodium aluminate is added as a solid to freshly prepared titanium silicate gels and blended until it apparently dissolves.

Sodium Chloride (NaCl) was obtained as an essentially anhydrous salt from Fisher Scientific. Sodium chloride was added to mixtures of low aluminum content to increase the ion content to a level approaching that of the higher aluminum content mixtures.

Calcined seed crystals are obtained by calcining a standard pilot plant run of approximately 80% ETS-10 and 15% ETS-4 to a temperature greater than 300° C. but less than 500° C. such that the ETS-4 decomposes while ETS-10 remains in tact. Seeds are not essential to ETAS-10 formation, but appear to shorten reaction times and broaden the range of acceptable gel compositions.

Thoroughly blended refers to gels which have been stirred by overhead stirrers to the point where they visually appear homogeneous. All blending is done at ambient temperature although acid base reactions and base dissolution may temporarily elevate the temperature of the gel.

All products of the examples are vacuum filtered, washed with an excess of deionized water (at least 10 cc/g) and dried at 200° C. for at least 30 minutes prior to any further treatment or testing.

Air-equilibration is carried out by exposure of dried samples to ambient air for a period of at least one hour.

SEM/EDS is scanning electron microscopy and energy dispersive spectroscopy.

Elemental analyses are presented on a volatile free basis as determined by x-ray fluorescence. The x-ray fluorescence sample preparation technique used involves exposure to elevated temperature—typically 1100° C. Thus, the samples presented as ammonium exchanged are in reality the hydrogen form since the said exposure at elevated temperatures converts the samples to some hydrogen form.

$^{27}Al$ N.M.R Spectra $^{27}Al$ N.M.R Spectra MAS NMR spectroscopy is a technique used to characterize the aluminum species in alumino-silicates and zeolites. All spectra were obtained from Spectral Data Services, Inc., Champaign, Ill. $^{27}Al$ Spectra were run by standard methods exposing the sample to a magnetic field of 8.45 tesla and spinning the sample at a rate of 8 kHz at the so-called magic angle, which reduces shielding anisotropy and dipolar interaction. Spectra were an average of 3000 to 8000 scans to increase resolution and signal-to-noise with a 0.3 sec recycle and summed. All samples were air-equilibrated (i.e. contained adsorbed water) before running spectra. Such equilibrated samples contain 15–20 wt % water. This equilibration both makes a reproducible state of hydration and enhances the observation of $^{27}Al$ MAS NMR species by increasing the techniques sensitivity.

$^{29}Si$ N.M.R. Spectra $^{29}Si$ MAS NMR spectroscopy is a technique used to characterize the silicon species in alumino-silicates and zeolites. All spectra were obtained from Spectral Data Services, Inc., Champaign, Ill. $^{29}Si$ spectra were run by standard methods exposing the sample to a magnetic field of 6.3 tesla and spinning the sample at a rate of 4 kHz at the so called magic angle, which reduces shielding anisotropy and dipolar interaction. Spectra were an average of 200 to 1500 scans to increase resolution and single-to-noise with a 80 to 120 sec recycle and summed. All samples were air-equilibrated (i.e. contained adsorbed water) before running spectra. Such equilibrated samples contain 15–20 wt. % water. This equilibration both makes a reproducible state of hydration and enhances the observation of $^{29}Si$ MAS NMR species by increasing the techniques sensitivity.

Dicharged Titanium—Titanium centers generate a charge of −2 when in octahedral coordination with oxygen. The charge results from 6 shared oxygen atoms impacting a charge of −12/2=−6. Ti (IV) imparts a charge of +4 such that the coordinated titanium center bears a net charge of −2.

Monocharged Aluminum—Aluminum centers generate a charge of −1 when in tetrahedral coordination with oxygen. The charge results from 4 shared oxygen atoms imparting a charge of $-8/2=-4$. Al (III) imparts a charge of $+3$ such that the coordinated aluminum center bears a net charge of $+1$.

What is claimed is:

1. A crystalline titanium-aluminum-silicate molecular sieve having a large pore size of approximately 9 Angstrom units and having a composition in terms of mole ratios of oxides as follows:

$$\left(1+\frac{x}{2}\right)(1.0 \pm 0.25\ M_{2/n}O): TiO_2: x\ AlO_2: y\ SiO_2: z\ H_2O$$

wherein M is at least one cation having a valence of n, y is from 2 to 10, x is from 0.05 to 5.0 and z is from 0 to 100, said molecular sieve being characterized by a) having an X-Ray powder diffraction pattern containing the following characteristic lines,

[SIGNIFICANT] $d$-SPACING (ANGS.)$I/I_o$

| | |
|---|---|
| 14.7 − .50 + 1.0 | W-M |
| 4.41 − .05 + 0.25 | W-M |
| 3.60 − .05 + 0.25 | VS |
| 3.28 − .05 + .2 | M-S | b) having mono-charged tetrahedrally coordinated aluminum in the framework, and c) having di-charged octahedrally coordinated titanium in the framework.

2. The composition of claim 1 wherein M is a mixture of sodium and potassium.

3. The composition of claim 1 wherein M comprises hydrogen.

4. The composition of claim 1 wherein M comprises rare earth.

* * * * *